US009777611B2

(12) United States Patent
Azuma et al.

(10) Patent No.: US 9,777,611 B2
(45) Date of Patent: Oct. 3, 2017

(54) CONSTRUCTION MACHINE

(71) Applicant: Hitachi Construction Machinery Co., Ltd., Bunkyo-ku, Tokyo (JP)

(72) Inventors: Hiroyuki Azuma, Ushiku (JP); Jun Yamabayashi, Ushiku (JP); Takahiro Kobayashi, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/896,144

(22) PCT Filed: May 26, 2014

(86) PCT No.: PCT/JP2014/063807
§ 371 (c)(1),
(2) Date: Dec. 4, 2015

(87) PCT Pub. No.: WO2014/196395
PCT Pub. Date: Dec. 11, 2014

(65) Prior Publication Data
US 2016/0115840 A1 Apr. 28, 2016

(30) Foreign Application Priority Data
Jun. 5, 2013 (JP) .................................. 2013-118737

(51) Int. Cl.
*B60K 13/04* (2006.01)
*F01N 13/18* (2010.01)
(Continued)

(52) U.S. Cl.
CPC .............. *F01N 3/208* (2013.01); *B60K 13/04* (2013.01); *E02F 9/0866* (2013.01);
(Continued)

(58) Field of Classification Search
CPC ... B60K 13/04; F01N 3/02; F01N 3/08; F01N 13/009; F01N 13/0093; F01N 13/02; F01N 13/1805; F01N 13/1816
See application file for complete search history.

(56) References Cited

U.S. PATENT DOCUMENTS

2006/0021593 A1* 2/2006 Banks, Jr. ............... F01N 13/16
123/198 R
2010/0031644 A1* 2/2010 Keane .................... B60K 13/04
60/295

(Continued)

FOREIGN PATENT DOCUMENTS

JP 2007-331602 A 12/2007
JP 2009-35111 A 2/2009

(Continued)

OTHER PUBLICATIONS

International Search Report (PCT/ISA/210) issued in counterpart International Application No. PCT/JP2014/063807 dated Jul. 15, 2014, with English translation (Four (4) pages).
Japanese language Written Opinion (PCT/ISA/237) issued in counterpart International Application No. PCT/JP2014/063807 dated Jul. 15, 2014 (Three (3) pages).

*Primary Examiner* — Frank Vanaman
(74) *Attorney, Agent, or Firm* — Crowell & Moring LLP

(57) ABSTRACT

An inlet port (17A) of a first exhaust gas purifying device (16) is provided on a side opposite to an engine (8) by sandwiching an axis (O1-O1) of a cylindrical body (17) of the first exhaust gas purifying device (16). An exhaust pipe (26) connecting the engine (8) and the first exhaust gas purifying device (16) is constituted by a lateral pipe line (27) extending in a left and right direction of an upper revolving structure (3) on a front side of the first exhaust gas purifying device (16) and having a bellows pipe (28) in the middle for absorbing relative displacement between the engine (8) and the first exhaust gas purifying device (16) and a bent pipe line (29) bent having a U-shape rearward from a tip end side (Continued)

of the lateral pipe line (27) and connected to the inlet port (17A) of the first exhaust gas purifying device (16).

4 Claims, 11 Drawing Sheets

(51) Int. Cl.
*F01N 3/20* (2006.01)
*E02F 9/08* (2006.01)
*F01N 13/00* (2010.01)

(52) U.S. Cl.
CPC ....... *F01N 13/009* (2014.06); *F01N 13/0093* (2014.06); *F01N 13/011* (2014.06); *F01N 13/1805* (2013.01); *F01N 13/1816* (2013.01); *B60Y 2200/412* (2013.01); *F01N 2590/08* (2013.01); *Y02T 10/24* (2013.01)

(56) References Cited

U.S. PATENT DOCUMENTS

| | | | |
|---|---|---|---|
| 2012/0017574 A1* | 1/2012 | Hasan | F01N 13/1805 60/297 |
| 2012/0247861 A1 | 10/2012 | Mizuno et al. | |
| 2013/0319787 A1 | 12/2013 | Kobayashi et al. | |
| 2014/0262590 A1* | 9/2014 | Daborn | F01N 3/035 180/309 |
| 2016/0115840 A1* | 4/2016 | Azuma | F01N 3/208 180/309 |

FOREIGN PATENT DOCUMENTS

| | | |
|---|---|---|
| JP | 2012-171596 A | 9/2012 |
| JP | 2012-215022 A | 11/2012 |
| JP | 2012-219624 A | 11/2012 |
| WO | WO 2011/152306 A1 | 12/2011 |

* cited by examiner

CONSTRUCTION MACHINE

TECHNICAL FIELD

The present invention relates to a construction machine such as a hydraulic excavator that is provided with an exhaust gas purifying device in an exhaust pipe of an engine, for example.

BACKGROUND ART

In general, a hydraulic excavator as a construction machine is constituted by an automotive lower traveling structure, an upper revolving structure mounted rotatably on the lower traveling structure, and a working mechanism provided on a front side of the upper revolving structure, capable of moving upward/downward. On the upper revolving structure, a cab, a fuel tank, an operation oil tank and the like are mounted on the front side of a revolving frame, and an engine, a hydraulic pump and the like are mounted on a rear side of the revolving frame.

For the engine of the hydraulic excavator, a diesel engine is used in general. This diesel engine is said to emit harmful substances such as particulate matters (PM), nitrogen oxides (NOx) and the like. Thus, the hydraulic excavator is constituted so that an exhaust gas purifying device is provided in an exhaust pipe forming an exhaust gas passage of the engine. As this exhaust gas purifying device, a PM trapping device having a diesel particular filter (DPF) for trapping particulate matters contained in the exhaust gas and a NOx purifying device for purifying nitrogen oxides (NOx) contained in the exhaust gas are known. Moreover, as the exhaust gas purifying device, a silencer for reducing an exhaust sound volume is also known.

Here, the engine is supported by a vibration isolating mount on the revolving frame. The exhaust gas purifying device is directly mounted on the revolving frame. In this case, a vibration system is different between the engine and the exhaust gas purifying device. Therefore, relative displacement (vibration) between the engine and the exhaust gas purifying device is constituted to be absorbed by a bellows pipe having a bellows shape provided in the middle of an exhaust pipe connecting the engine and the exhaust gas purifying device (Patent Document 1).

PRIOR ART DOCUMENT

Patent Document

Patent Document 1: International Publication No. WO 2011-152306 A1

SUMMARY OF THE INVENTION

Incidentally, in the aforementioned Patent Document 1, two exhaust gas purifying devices are arranged above the hydraulic pump by overlapping parts thereof in an up and down direction in a state close to the engine. However, the bellows pipe needs some length to sufficiently absorb vibration. Therefore, the exhaust pipe with the bellows pipe is disposed so as to lie across the engine above the engine. In this case, a space for disposing the exhaust pipe needs to be ensured above the engine. As a result, there is a problem that a size of the exhaust gas purifying device including the exhaust pipe increases as a whole.

The present invention is made in view of a problem of the aforementioned conventional art, and an object of the present invention is to provide a construction machine in which the exhaust pipe with the bellows pipe can be arranged efficiently in a limited space around the engine.

(1) A construction machine according to the present invention comprises: an automotive vehicle body; an engine mounted on the vehicle body in a laterally placed state extending in a left and right direction of the vehicle body; a hydraulic pump provided on one side in a length direction of the engine; an exhaust pipe connected to an exhaust port of the engine; a first exhaust gas purifying device provided on an outlet side of the exhaust pipe; a connecting pipe connected to an outlet port of the first exhaust gas purifying device; and a second exhaust gas purifying device provided on an outlet side of the connecting pipe.

In order to solve the aforementioned problem, a characteristic of the configuration adopted by the present invention is that each of the first exhaust gas purifying device and the second exhaust gas purifying device has a cylindrical body having an axis extending in a front and rear direction of the vehicle body, respectively, and arranged on an upper side of the hydraulic pump so as that each cylindrical body becomes parallel with each other; an inlet port of the first exhaust gas purifying device is provided on a side opposite to the engine by sandwiching the axis of the cylindrical body of the first exhaust gas purifying device; and the exhaust pipe is constituted by a lateral pipe line extending in the left and right direction of the vehicle body on a front side of the first exhaust gas purifying device and having a bellows pipe for absorbing relative displacement between the engine and the first exhaust gas purifying device in the middle and a bent pipe line bent rearward having a U-shape from a tip end side of the lateral pipe line and connected to the inlet port of the first exhaust gas purifying device.

With this arrangement, the inlet port of the first exhaust gas purifying device is provided on the side opposite to the engine by sandwiching the axis of the cylindrical body of the first exhaust gas purifying device, and the exhaust pipe is extended in the left and right direction of the vehicle body on the front side of the first exhaust gas purifying device. Thus, even if the first exhaust gas purifying device is arranged at a position close to the engine above the hydraulic pump, a length dimension (path) of the exhaust pipe connecting the engine and the first exhaust gas purifying device can be made longer. As a result, the bellows pipe having a length that the relative displacement (vibration) between the engine and the first exhaust gas purifying device can be stably absorbed can be provided on this exhaust pipe.

The exhaust pipe is disposed in a state extended in the left and right direction of the vehicle body on the front side of the first exhaust gas purifying device. Therefore, there is no need to dispose the exhaust pipe on an upper side of the engine, and a space between the upper side of the engine and an engine cover covering an upper part thereof can be made smaller. As a result, a height dimension of the engine cover can be suppressed, and visibility of a rear of an operator is improved.

(2) According to the present invention, the inlet port of the first exhaust gas purifying device is provided above the exhaust port of the engine; the lateral pipe line of the exhaust pipe has a horizontal pipe line part extending horizontally from the exhaust port of the engine and an inclined pipe line part inclined upward toward the bent pipe line from a tip end side of the horizontal pipe line part; and the bellows pipe is constituted to be provided on the inclined pipe line part.

With this arrangement, the inlet port of the first exhaust gas purifying device and the exhaust port of the engine are provided at different positions in the up and down direction, and the bellows pipe is provided on the inclined pipe line part of the exhaust pipe. Therefore, the bellows pipe can cause the relative displacement between the engine and the first exhaust gas purifying device to act on a bending direction of the bellows pipe more easily. As a result, the relative displacement between the engine and the first exhaust gas purifying device can be effectively absorbed by bending deformation of the bellows pipe, and stability of the construction machine can be improved.

(3) According to the present invention, the first exhaust gas purifying device and the second exhaust gas purifying device are arranged by overlapping each other in an up and down direction in a state connected by the connecting pipe; and the first exhaust gas purifying device is located on a lower side of the second exhaust gas purifying device.

With this arrangement, the first exhaust gas purifying device and the second exhaust gas purifying device are overlapped in the up and down direction in the state connected by the connecting pipe. As a result, the two exhaust gas purifying devices can be arranged in a narrow space around the engine in a compact manner.

(4) According to the present invention, the first exhaust gas purifying device and the second exhaust gas purifying device are arranged by overlapping each other in an up and down direction in a state connected by the connecting pipe; and the first exhaust gas purifying device is located on an upper side of the second exhaust gas purifying device.

With this arrangement, the first exhaust gas purifying device is located on the upper side of the second exhaust gas purifying device. Accordingly, the exhaust pipe connecting the engine and the first exhaust gas purifying device can be formed longer between the engine and the first exhaust gas purifying device. Therefore, a degree of freedom in selecting a length, a number, a position and the like of the bellow pipe to be provided on the exhaust pipe can be increased. As a result, the relative displacement between the engine and the first exhaust gas purifying device can be absorbed by the bellows pipe more efficiently.

BRIEF DESCRIPTION OF THE DRAWINGS

FIG. 4 is an enlarged plan view showing an engine, an exhaust pipe, a first and second exhaust gas purifying devices and the like.

FIG. 6 is a perspective view showing the engine, a hydraulic pump, an exhaust pipe, the first and second exhaust gas purifying devices and the like.

MODE FOR CARRYING OUT THE INVENTION

Hereinafter, as a typical example of a construction machine according to an embodiment of the present invention, a hydraulic excavator on which an engine is mounted will be described as an example in detail by referring to the attached drawings.

Figure 1:
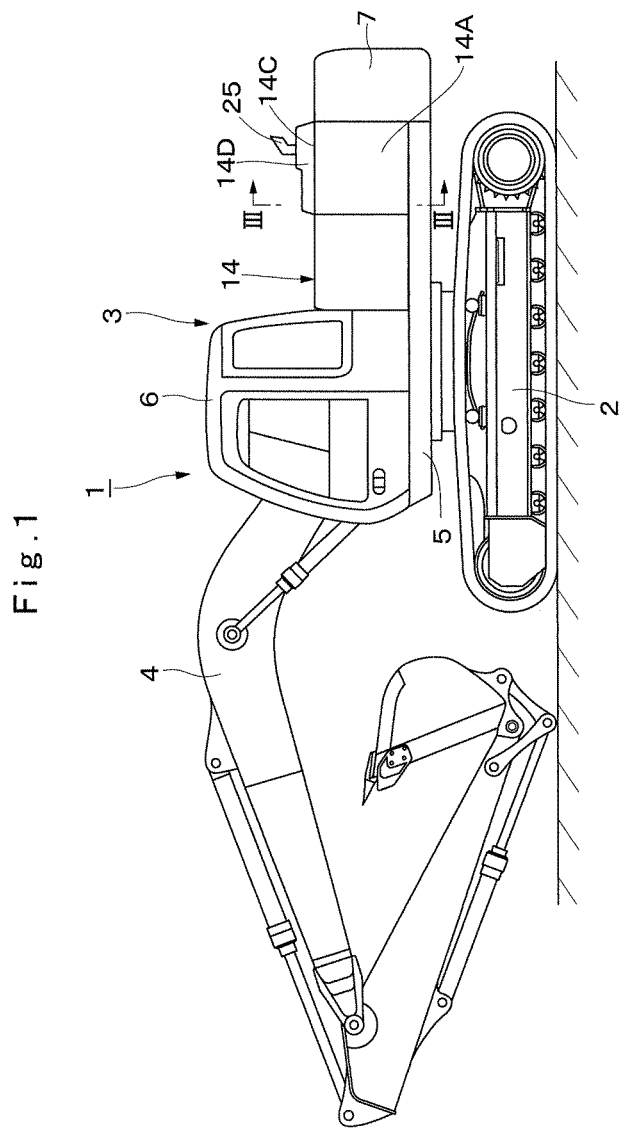
FIG. 1 is a lateral side view showing a hydraulic excavator that is applied to an embodiment of the present invention.

In FIG. 1, designated at 1 is a crawler type hydraulic excavator as a construction machine. This hydraulic excavator 1 is constituted by an automotive crawler type lower traveling structure 2, an upper revolving structure 3 rotatably mounted on the lower traveling structure 2 and constituting a vehicle body together with the lower traveling structure 2, and a working mechanism 4 provided on a front side of the upper revolving structure 3 in a front and rear direction capable of moving upward/downward and performing an excavating work of earth and sand.

Figure 2:
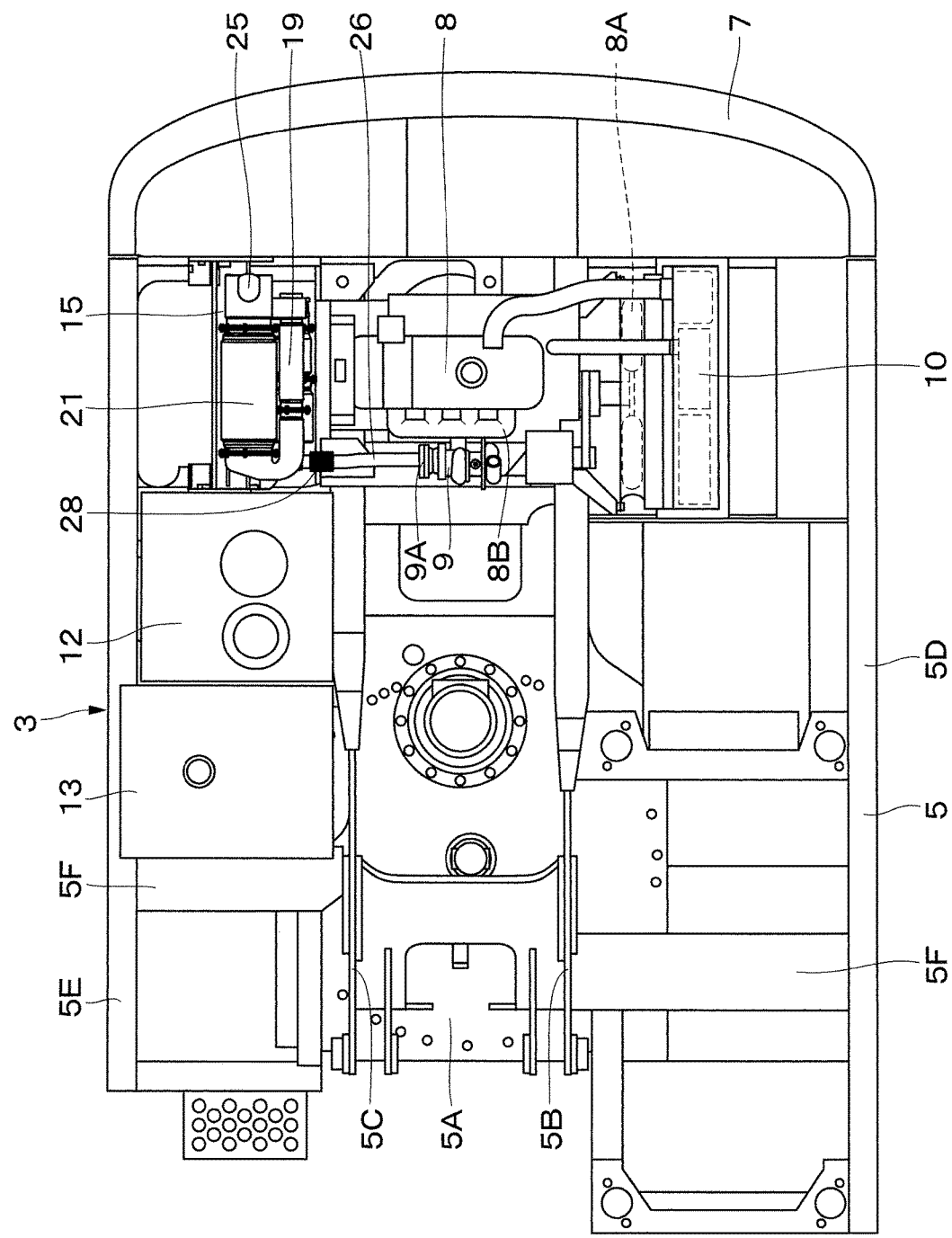
FIG. 2 is a plan view showing an upper revolving structure in which a cab, a housing cover and the like are omitted.
Figure 3:
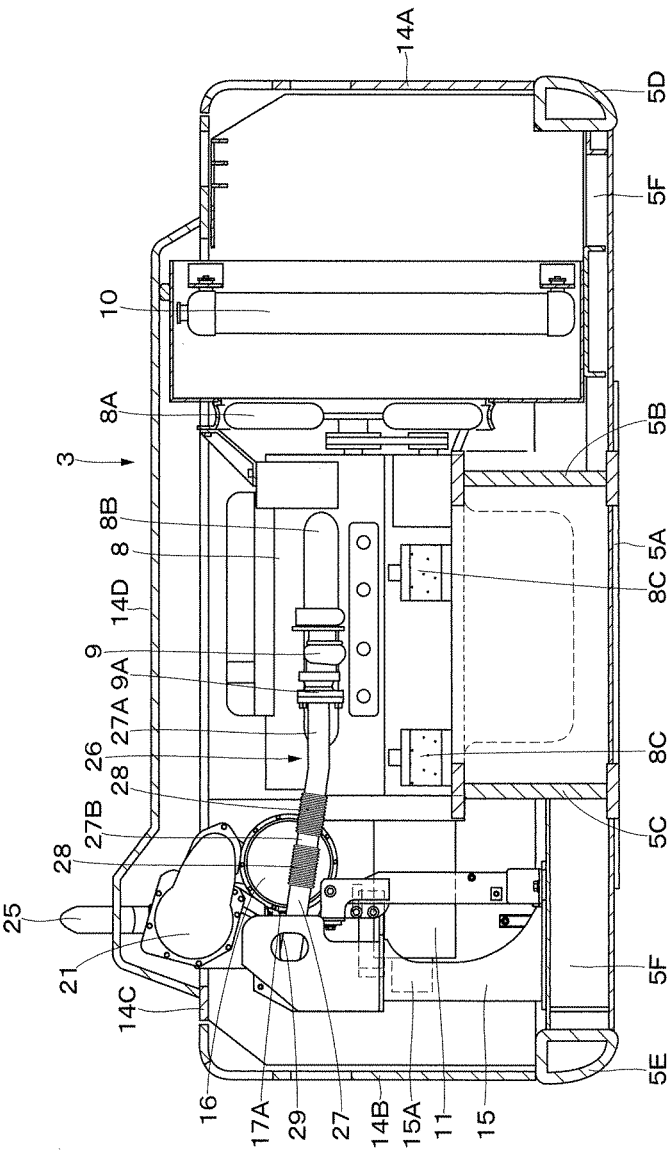
FIG. 3 is a sectional view when seen from an arrow III-III direction in FIG. 1.

A revolving frame 5 forms a support structural body of the upper revolving structure 3. As shown in FIGS. 2 and 3, this revolving frame 5 includes a bottom plate 5A made of a thick steel plate extending in the front and rear direction, a left vertical plate 5B and a right vertical plate 5C provided upright on the bottom plate 5A and extending in the front and rear direction at a predetermined interval in a left and right direction, a left side frame 5D and a right side frame 5E arranged in the left and right direction of each of the vertical plates 5B and 5C at an interval and extending in the front and rear direction, and a plurality of extension beams 5F extending in the left and right direction from the bottom plate 5A and each of the vertical plates 5B and 5C and supporting the left and right side frames 5D and 5E on tip end portions thereof.

On a front side of the revolving frame 5, the working mechanism 4 is mounted capable of moving upward/downward by being located between the left and right vertical plates 5B and 5C. A counterweight 7 which will be described later, an engine 8 and the like are provided on a rear side of the revolving frame 5.

A cab 6 is mounted on a front left side of the revolving frame 5. This cab 6 is for an operator to get on. Inside the cab 6, a driver's seat on which the operator is seated, an operation lever for running, and an operation lever for work (none of them is shown) are disposed. On the other hand, the counterweight 7 is mounted on a rear end portion of the revolving frame 5, and the counterweight 7 is to take a weight balance with the working mechanism 4.

Figure 6:
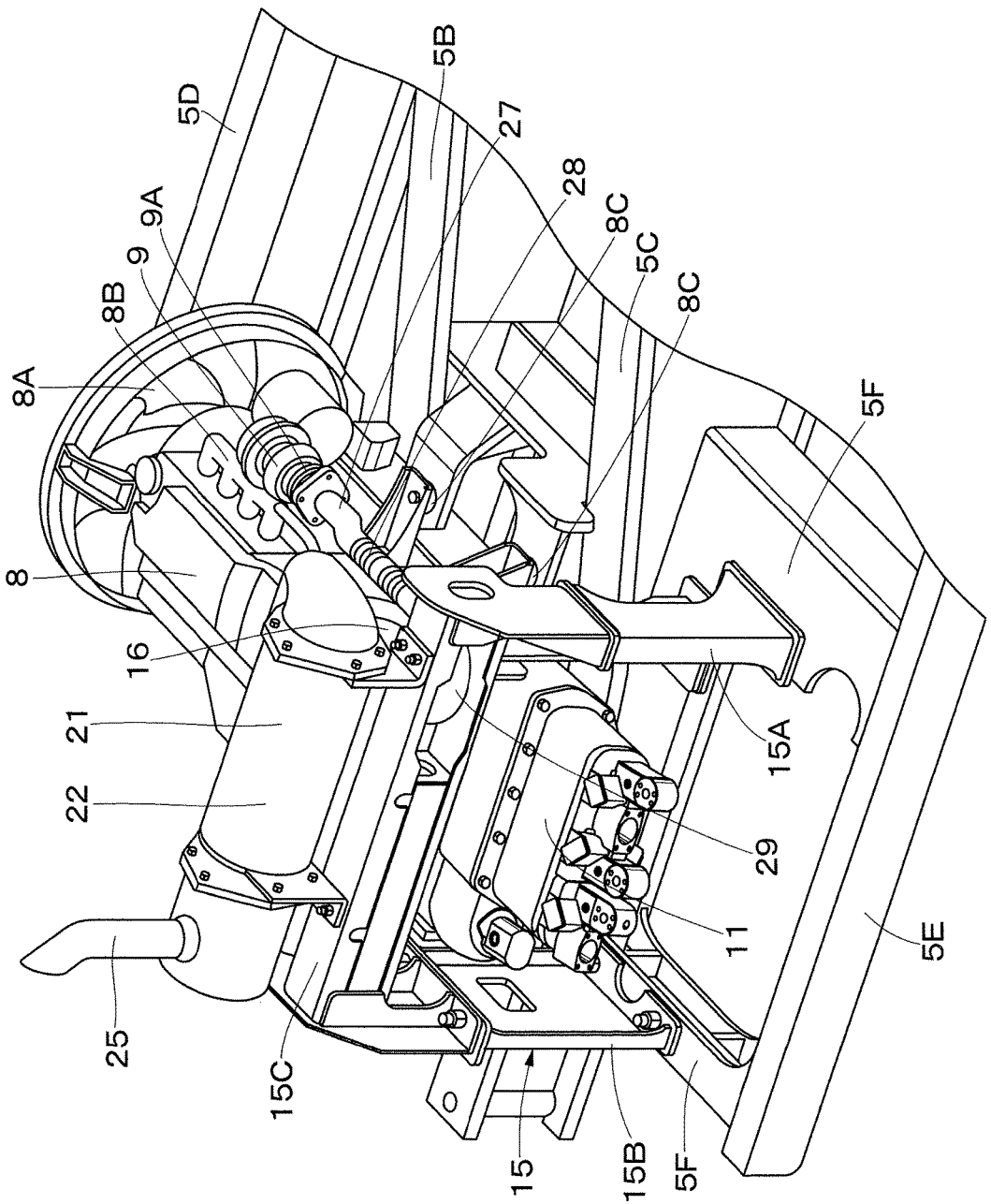
Figure 7:
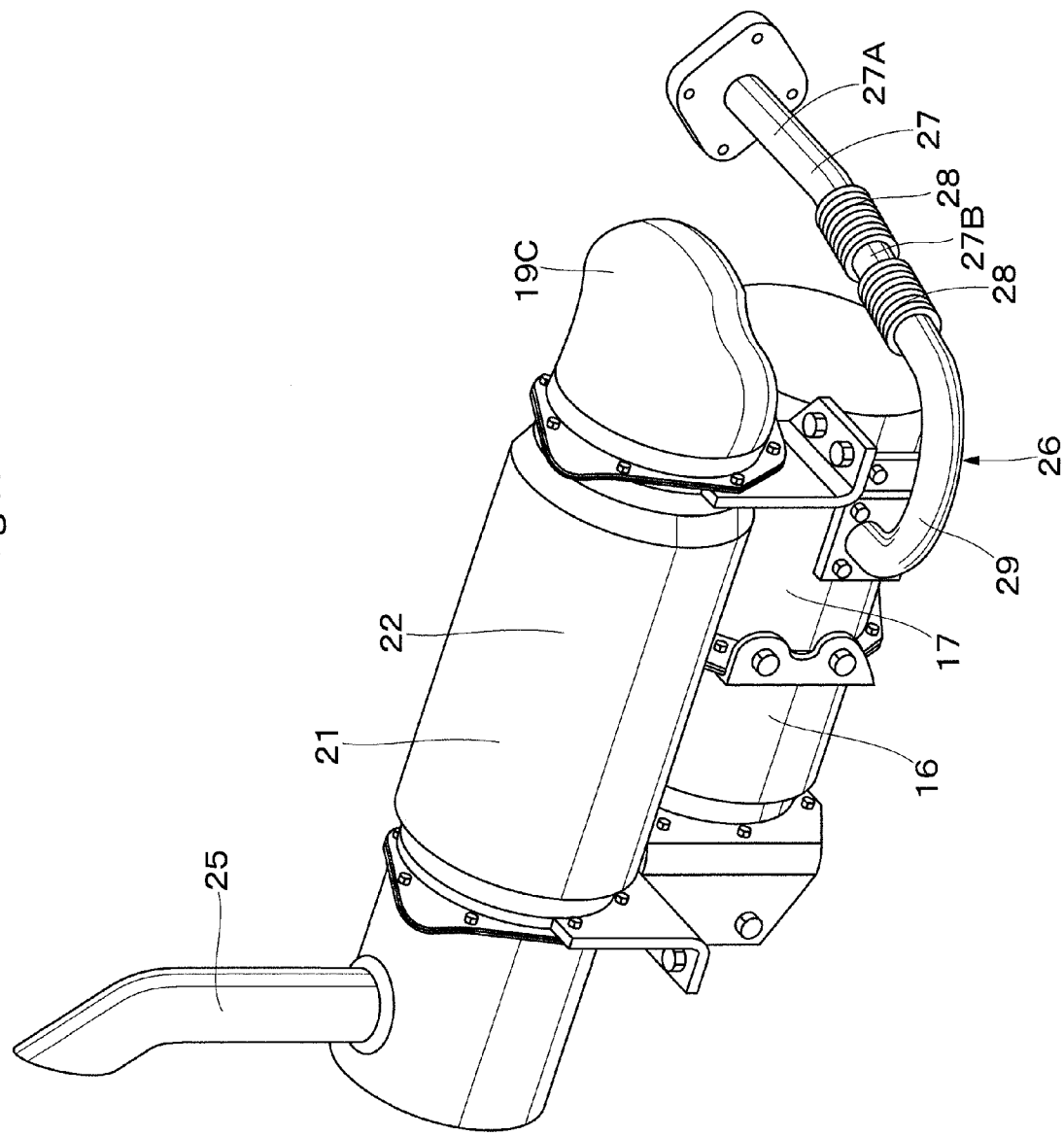
FIG. 7 is a perspective view showing the exhaust pipe and the first and second exhaust gas purifying devices in a state removed from the engine.

The engine 8 is provided on the rear side of the revolving frame 5, and the engine 8 is mounted in a laterally placed state extending in the left and right direction of the upper revolving structure 3 (vehicle body). As shown in FIGS. 2 and 3, a cooling fan 8A for supplying cooling air to a heat exchanger 10 which will be described later is provided on a left side of the engine 8. On the other hand, a hydraulic pump 11 which will be described later is provided on a right side of the engine 8. Moreover, a supercharger 9 which will be described later is connected to an exhaust manifold 8B and provided on an upper part on a front side of the engine 8. The engine 8 is supported in a vibration isolating state by the revolving frame 5 through four vibration isolating mounts 8C (only two of them are shown in FIGS. 3 and 6).

The supercharger (turbocharger) 9 constitutes a part of the engine 8, and the supercharger 9 is located on the front side of the engine 8 and is connected to the exhaust manifold 8B, and an exhaust port 9A is opened toward a right side of the upper revolving structure 3 in the left and right direction. Here, the exhaust port 9A of the supercharger 9 is to exhaust an exhaust gas from the engine 8, and an exhaust pipe 26 which will be described later is connected to the exhaust port 9A of this supercharger 9.

The heat exchanger 10 is disposed on the left side of the engine 8 and the heat exchanger 10 is provided facing the cooling fan 8A of the engine 8. Here, the heat exchanger 10 is constituted by a radiator for cooling engine coolant, an oil cooler for cooling hydraulic oil, an intercooler for cooling air sucked by the engine 8 and the like.

The hydraulic pump 11 is provided on the right side of the engine 8, and the hydraulic pump 11 is driven by the engine 8. The hydraulic pump 11 delivers the hydraulic oil supplied from a hydraulic oil tank 12 which will be described later as a pressurized oil to a control valve device (not shown).

The hydraulic oil tank 12 is located on the front side of the hydraulic pump 11 and provided on the right side of the revolving frame 5, and the hydraulic oil tank 12 is to store the hydraulic oil for driving an actuator provided on the lower traveling structure 2 and the working mechanism 4. On the other hand, a fuel tank 13 is located on the front side of the hydraulic oil tank 12 and provided on the revolving frame 5.

A housing cover 14 is to cover the engine 8, the heat exchanger 10, and equipment including first and second exhaust gas purifying devices 16 and 21 which will be described later from a side and above. This housing cover 14 is provided on the revolving frame 5 by being located between the cab 6 and the counterweight 7. As shown in FIGS. 1 and 3, the housing cover 14 includes a left surface cover part 14A covering the left side of the heat exchanger 10, a right surface cover part 14B covering the right side of the hydraulic pump 11, and an upper surface cover part 14C located on an upper side of each of the cover parts 14A and 14B and covering an upper side of the engine 8.

An engine cover part 14D opened/closed when a maintenance work of the engine 8 is to be performed is provided on the upper surface cover part 14C. The engine cover part 14D is formed with a portion on upper sides of the first and second exhaust gas purifying devices 16 and 21 higher than the other portions by one stage, and an opening for causing a tail pipe 25 which will be described later to protrude to the upper side is provided. It may be so constituted that the tailpipe is integrally mounted on the engine cover part and the exhaust pipe extending from the second exhaust gas purifying device is connected to this tail pipe.

A support bracket 15 is located on the right side of the engine 8 and is provided on the revolving frame 5, and the support bracket 15 is to support the first exhaust gas purifying device 16 and the second exhaust gas purifying device 21 which will be described later with respect to the revolving frame 5. The support bracket 15 is substantially constituted by a front leg part 15A rising up from the extension beam 5F located on the front side of the hydraulic pump 11 to above the hydraulic pump 11, a rear leg part 15B faced with the front leg part 15A by sandwiching the hydraulic pump 11 and rising up from the extension beam 5F located on the rear side of the hydraulic pump 11 to above the hydraulic pump 11, and a purifying device mounting frame 15C extending in a horizontal direction above the hydraulic pump 11 between the front leg part 15A and the rear leg part 15B.

On the purifying device mounting frame 15C, the first exhaust gas purifying device 16 and the second exhaust gas purifying device 21 which will be described later are mounted by using a bolt or the like. That is, the support bracket 15 supports the first exhaust gas purifying device 16 and the second exhaust gas purifying device 21 which will be described later on the revolving frame 5 from both sides in a state located over the hydraulic pump 11 in the front and rear direction.

Subsequently, a constitution in which the exhaust gas exhausted from the engine 8 is exhausted to an outside of the upper revolving structure 3 will be described.

The first exhaust gas purifying device 16 is mounted on the revolving frame 5 through the support bracket 15, and the first exhaust gas purifying device 16 is located on the upper side of the hydraulic pump 11 and is provided on the outlet side of the exhaust pipe 26 which will be described later. The first exhaust gas purifying device 16 is located on a side closer to the engine 8 in the upper revolving structure 3 in the left and right direction than the second exhaust gas purifying device 21 which will be described later. The first exhaust gas purifying device 16 is constituted by a cylindrically shaped cylindrical body 17 extending with an axis O1-O1 in the front and rear direction of the upper revolving structure 3 in a state fixed to the purifying device mounting frame 15C of the support bracket 15 by using a bolt and the like and an oxidation catalyst 18 arranged in the cylindrical body 17.

The oxidation catalyst 18 constitutes one of a treatment member for purifying the exhaust gas, and the oxidation catalyst 18 is made of a ceramic cell-shaped cylindrical body, for example, and a large number of through holes are formed in an axial direction thereof, and an inner surface is coated with precious metal or the like. The oxidation catalyst 18 is to oxidize and to remove carbon monoxide (CO), hydrocarbon (HC) and the like contained in this exhaust gas by causing the exhaust gas to flow through each of the through holes at a predetermined temperature. On the other hand, the oxidation catalyst 18 can burn and remove particulate matters (PM) as necessary.

On the other hand, the cylindrical body 17 is formed as a sealed container by closing both ends thereof. An inlet port 17A formed of a pipe body extending to an outer side in a radial direction of the cylindrical body 17 is provided on a front side portion which is an upstream side of the cylindrical body 17.

Figure 5:
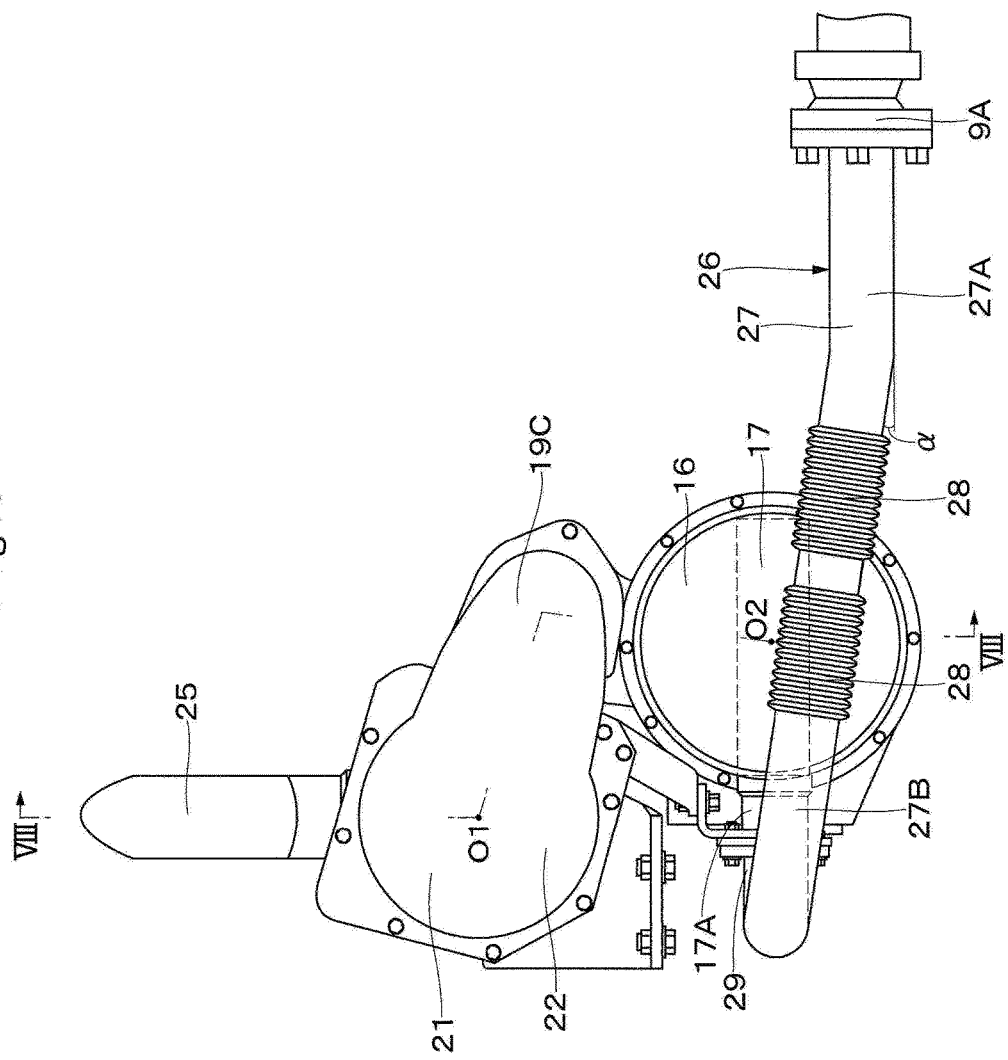
FIG. 5 is an enlarged view of the exhaust pipe and the first and second exhaust gas purifying devices when seen from an arrow V-V direction in FIG. 4.

As shown in FIGS. 3 and 5, this inlet port 17A is provided on a side opposite to the engine 8 by sandwiching the axis O1-O1 of the cylindrical body 17 in the first exhaust gas purifying device 16. Specifically, one end of the inlet port 17A in the length direction is inserted into the cylindrical body 17, while the other end is protruded outward in the radial direction toward the right surface cover part 14B side. This inlet port 17A is provided above the exhaust port 9A of the supercharger 9 of the engine 8, and the outlet side of the exhaust pipe 26 which will be described later is constituted to be connected to a protruding end side by a bolt.

As a result, a length dimension (path) of the exhaust pipe 26 which will be described later can be formed long between the exhaust port 9A and the inlet port 17A. Therefore, it is so constituted that the relative displacement between the engine 8 and the first exhaust gas purifying device 16 can be effectively absorbed by setting the bellows pipe 28 of the exhaust pipe 26 long.

Moreover, a large number of through holes 17B (see FIG. 8) are provided in a portion inserted in the cylindrical body 17 in the inlet port 17A. Each of these through holes 17B reduces (silences) an exhaust noise. An outlet port 17C is provided in a rear-side portion which is a downstream side of the cylindrical body 17 by being opened upward. An inlet side of the connecting pipe 19 which will be described later is connected to this outlet port 17C.

The connecting pipe 19 is connected to the outlet port 17C of the cylindrical body 17 in the first exhaust gas purifying device 16, and the connecting pipe 19 connects the first exhaust gas purifying device 16 and the second exhaust gas purifying device 21 which will be described later to each other. The connecting pipe 19 is constituted by a cylinder part 19A formed of a cylindrical body arranged in a space on an immediately upper side of the cylindrical body 17 of the first exhaust gas purifying device 16 and above the hydraulic pump 11 and extending in parallel with the axis O1-O1 of the cylindrical body 17, an upstream lid plate 19B closing an end edge on the inlet side which is an upstream side of the cylinder part 19A, and a downstream lid plate 19C closing an end edge on the outlet side which is a downstream side of the cylinder part 19A.

The connecting pipe 19 has an inlet side (rear side) connected to the outlet port 17C of the cylindrical body 17 of the first exhaust gas purifying device 16, and an outlet side (front side) connected to an intake port 22A of a cylindrical body 22 of the second exhaust gas purifying device 21 which will be described later. As a result, the connecting pipe 19 can lead the exhaust gas exhausted from the first exhaust gas purifying device 16 to the second exhaust gas purifying device 21.

A urea water injection nozzle 20 is provided on the connecting pipe 19 and the urea water injection nozzle 20 constitutes a part of a NOx purifying device. The urea water injection nozzle 20 is mounted on the upstream lid plate 19B on the axis of a connection end portion of the connecting pipe 19 and is connected to a urea water tank storing a urea aqueous solution through a pump (none of them is shown). The urea water injection nozzle 20 is to inject the urea aqueous solution toward the exhaust gas flowing through the cylindrical part 19A.

The second exhaust gas purifying device 21 is mounted on the revolving frame 5 through the support bracket 15 and the second exhaust gas purifying device 21 is provided on the outlet side of the connecting pipe 19 and is arranged on an upper side of the first exhaust gas purifying device 16.

Here, the second exhaust gas purifying device 21 is constituted by a cylindrically shaped cylindrical body 22 having an axis O2-O2 extending in the front and rear direction of the upper revolving structure 3 in a state fixed to the purifying device mounting frame 15C of the support bracket 15 by using a bolt and the like, a selective reduction catalyst 23 arranged in the cylindrical body 22 and selectively reducing and reacting nitrogen oxides (NOx) with ammonium and decomposing it to water and nitrogen, an oxidation catalyst 24 arranged on a downstream side of the selective reduction catalyst 23, oxidizing residue ammonium remaining after the nitrogen oxides are reduced by the selective reduction catalyst 23 and separating it to nitrogen and water, and the tail pipe 25 located on the downstream side of the oxidation catalyst 24 and protruding toward an upper side from the cylindrical body 22.

Figure 4:
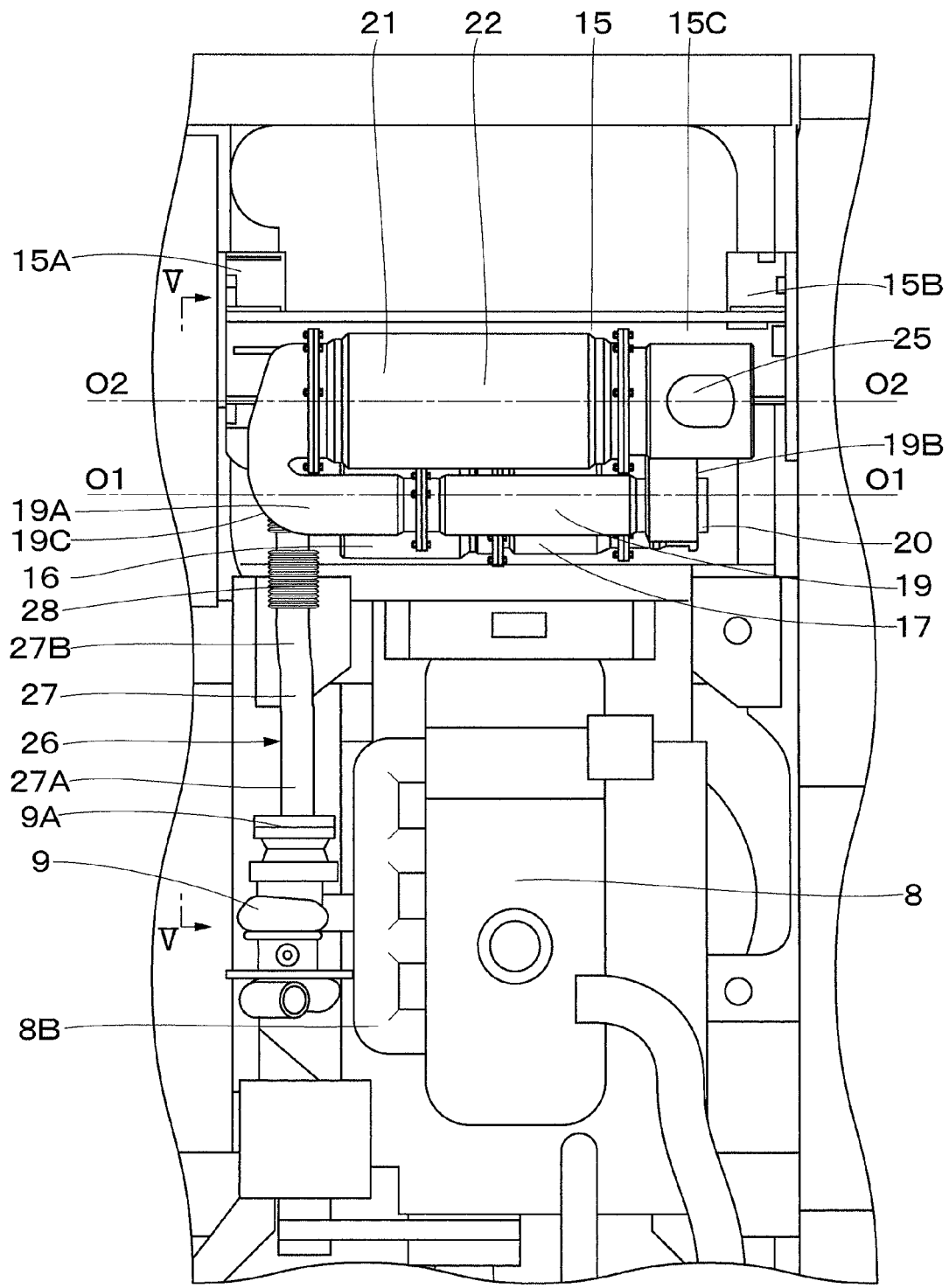
Figure 8:
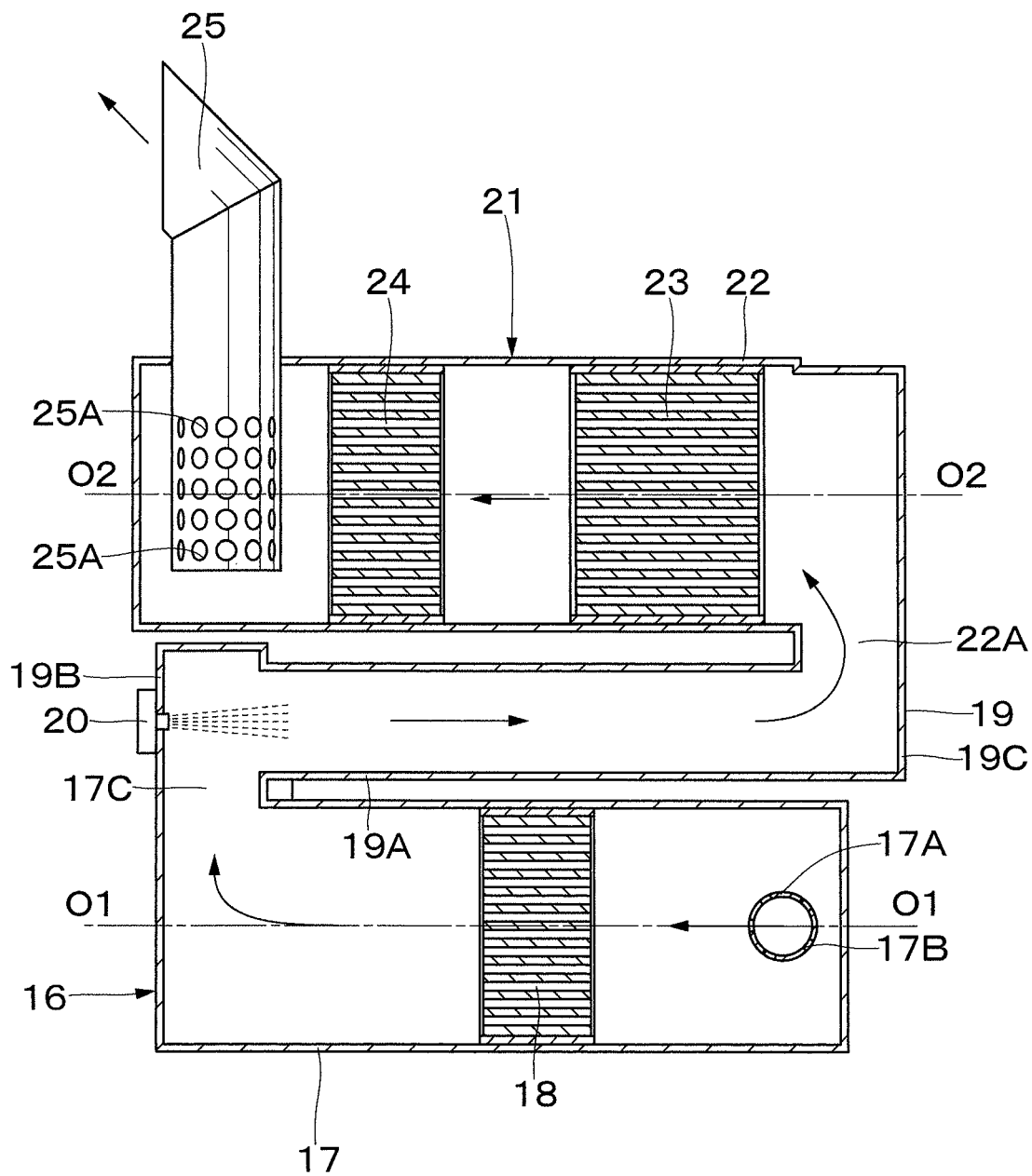
FIG. 8 is a sectional view of the first and second exhaust gas purifying devices when seen from an arrow VIII-VIII direction in FIG. 5.

As shown in FIGS. 4 and 8, the cylindrical body 22 of the second exhaust gas purifying device 21 is formed as a sealed container by closing the both ends and is a cylindrical body somewhat longer than the cylindrical body 17 of the first exhaust gas purifying device 16. The second exhaust gas purifying device 21 is arranged on the upper side of the first exhaust gas purifying device 16 and in a space above the hydraulic pump 11. The axis O2-O2 of the cylindrical body 22 is in a parallel positional relation with the axis O1-O1 of the cylindrical body 17 of the first exhaust gas purifying device 16 at a position shifted to the right surface cover part 14B side from the same perpendicular plane as the axis O1-O1 of the cylindrical body 17 of the first exhaust gas purifying device 16. That is, the first exhaust gas purifying device 16 and the second exhaust gas purifying device 21 are arranged so as to partially overlap each other on a plan view (upper view).

The front side portion which is the upstream side of the cylindrical body 22 slightly protrudes forward from the front side which is the upstream side of the cylindrical body 17 of the first exhaust gas purifying device 16, and a rear side portion which is a downstream side of the cylindrical body 22 slightly protrudes rearward from the rear side which is the downstream side of the cylindrical body 17. The intake port 22A is provided on the front side portion of the cylindrical body 22 by protruding to the engine 8 side. The outlet side of the connecting pipe 19 is connected to this intake port 22A. Moreover, the tail pipe 25 protruding to the outer side in the radial direction is connected to the rear side portion which is the downstream side of the cylindrical body 22.

The selective reduction catalyst 23 is made of a ceramic cell-shaped cylindrical body, for example, and a large number of through holes are formed in the axial direction thereof, and an inner surface is coated with precious metal. This selective reduction catalyst 23 is usually to subject the nitrogen oxides (NOx) contained in the exhaust gas exhausted from the engine 8 to selective reduction reaction by ammonium generated from the urea aqueous solution so as to be decomposed to nitrogen and water.

On the other hand, the oxidation catalyst 24 is made of a ceramic cell-shaped cylindrical body substantially similarly to the aforementioned oxidation catalyst 18, a large number of through holes are formed in the axial direction thereof, and an inner surface is coated with precious metal. As a result, the oxidation catalyst 24 oxidizes the residue ammonium after the nitrogen oxides are reduced by the selective reduction catalyst 23 and separates it to nitrogen and water.

Moreover, the tail pipe 25 is located on the rear side portion which is the downstream side (downstream side of the oxidation catalyst 24) of the cylindrical body 22, one end in the length direction is inserted into the cylindrical body 22, and the other end protrudes upward in the radial direction. A large number of through holes 25A are provided on a lower side portion of the tail pipe 25 entering the cylindrical body 22. Each of these through holes 25A is to reduce (to silence) the exhaust noise. On the other hand, an upper side portion of the tail pipe 25 protruding from the cylindrical body 22 is inserted into the opening of the engine cover part 14D, and an upper end is bent rearward and forms an outlet of the exhaust gas.

Subsequently, the exhaust pipe 26 connecting the engine 8 and the first exhaust gas purifying device 16 to each other will be described.

The exhaust pipe 26 is connected to the exhaust port 9A of the supercharger 9 constituting the engine 8. This exhaust pipe 26 is formed as a pipe line made of metal and to lead the exhaust gas at a high temperature exhausted from the engine 8 to the first exhaust gas purifying device 16. The exhaust pipe 26 extends in the left and right direction of the upper revolving structure 3 along the engine 8 and is provided horizontally or with inclination toward the inlet port 17A of the exhaust gas purifying device 16. Here, the exhaust pipe 26 is constituted by a lateral pipe line 27 and a bent pipe line 29 which will be described later.

The lateral pipe line 27 extends on the front side of the first exhaust gas purifying device 16 and in the left and right direction of the upper revolving structure 3. The lateral pipe line 27 is constituted by a horizontal pipe line part 27A extending horizontally from the exhaust port 9A of the supercharger 9 of the engine 8 and an inclined pipe line part 27B inclined upward toward the bent pipe line 29 which will be described later from a tip end side of the horizontal pipe line part 27A.

As shown in FIG. 5, the horizontal pipe line part 27A has a base end side (upstream side) connected to the exhaust port 9A of the supercharger 9 of the engine 8 and extending substantially horizontally rearward. On the other hand, the inclined pipe line part 27B is inclined upward by an angle α to the horizontal pipe line part 27A from the tip end side of the horizontal pipe line part 27A and extended to the front side of the cylindrical body 17 of the first exhaust gas purifying device 16 and below the intake port 22A of the second exhaust gas purifying device 21 toward the right surface cover part 14B side. The tip end side of the inclined pipe line part 27B is located on substantially the same horizontal plane as the inlet port 17A provided in the cylindrical body 17 and is connected to the bent pipe line 29 which will be described later.

As described above, the inclined pipe line part 27B makes the length dimension of the exhaust pipe 26 longer by using a space formed between the lower side of the intake port 22A of the second exhaust gas purifying device 21 and the front side of the cylindrical body 17 of the first exhaust gas purifying device 16 and by being disposed therein. As a result, the exhaust pipe 26 and the first and second exhaust gas purifying devices 16 and 21 can be disposed in a narrow space around the engine 8 in a compact manner.

The bellows pipe 28 is provided in the middle of the exhaust pipe 26 to absorb the relative displacement between the engine 8 and the first exhaust gas purifying device 16. The bellows pipes 28 are arranged at two spots in the middle portion of the inclined pipe line part 27B of the lateral pipe line 27 constituting the exhaust pipe 26. Each of the bellows pipes 28 is formed as a metal cylindrical body having a bellows shape and the both ends of each of the bellows pipes 28 are integrally fastened to the inclined pipe line part 27B by using welding means.

In this case, the bellows pipe 28 is provided in the middle of the inclined pipe line part 27B of the lateral pipe line 27. Therefore, the relative displacement in the front and rear direction, in the up and down direction, and in the left and right direction acting on the exhaust port 9A of the engine 8 and the inlet port 17A of the first exhaust gas purifying device 16 can be easily made to act on a bending direction of the bellows pipe 28. As a result, the relative displacement between the engine 8 and the first exhaust gas purifying device 16 can be effectively absorbed by the bending deformation of the bellows pipe 28.

The bent pipe line 29 is connected to the tip end side (downstream side) of the inclined pipe line part 27B constituting the lateral pipe line 27. The bent pipe line 29 is bent having the U-shape rearward from the tip end side of the inclined pipe line part 27B and has the downstream side connected to the inlet port 17A of the cylindrical body 17 of the first exhaust gas purifying device 16 by a bolt and the like.

In this case, the inlet port 17A of the first exhaust gas purifying device 16 is provided on the side opposite to the engine 8 by sandwiching the axis O1-O1 of the cylindrical body 17 of the first exhaust gas purifying device 16. Therefore, as compared with the case in which the inlet port 17A of the first exhaust gas purifying device 16 is provided on the engine 8 side, the length dimension of the lateral pipe line 27 of the exhaust pipe 26 can be formed longer only by an outer diameter dimension of the cylindrical body 17 of the first exhaust gas purifying device 16. As a result, it is so constituted that the bellows pipe 28 having a length that can stably absorb the relative displacement between the engine 8 and the first exhaust gas purifying device 16 can be provided on the lateral pipe line 27.

The hydraulic excavator 1 according to this embodiment has the constitution as above and its operation will be described below.

The operator onboard the cab 6 starts the engine 8 and drives the hydraulic pump 11. Accordingly, the pressurized oil from the hydraulic pump 11 is supplied to various actuators through the control valve device. As a result, when the operator operates the operation lever for running (not shown), the lower traveling structure 2 can be advanced or retreated. On the other hand, when the operator operates the operation lever for work (not shown), the working mechanism 4 is operated and an excavating work of earth and sand or the like can be performed.

Here, the exhaust gas exhausted from the engine 8 during the operation of the engine 8 is introduced into the inlet port 17A of the first exhaust gas purifying device 16 through the exhaust pipe 26 from the exhaust port 9A of the engine 8. As shown by an arrow in FIG. 8, the exhaust gas is exhausted into the air from the inlet port 17A of the first exhaust gas purifying device 16 through the connecting pipe 19 and the second exhaust gas purifying device 21.

In this case, the oxidation catalyst 18 provided in the first exhaust gas purifying device 16 oxidizes and removes carbon monoxide (CO), hydrocarbon (HC) and the like contained in the exhaust gas. The oxidation catalyst 18 burns and removes PM as necessary. On the other hand, the urea water is injected into the connecting pipe 19. As a result, the selective reduction catalyst 23 in the second exhaust gas purifying device 21 decomposes the nitrogen oxides to nitrogen and water. Moreover, the oxidation catalyst 24 oxidizes the residue ammonium and separates it to nitrogen and water and exhausts the purified exhaust gas into the air.

Moreover, during running and working of the hydraulic excavator 1, the engine 8 supported through the vibration isolating mount 8C is vibrated on the revolving frame 5. However, the first exhaust gas purifying device 16 and the second exhaust gas purifying device 21 are mounted on the revolving frame 5 through the support bracket 15 and thus, they are vibrated in a vibration system different from the engine 8. Therefore, the engine 8 and the first and second exhaust gas purifying devices 16 and 21 are relatively displaced. In this case, the relative displacement between the engine 8 and the first and second exhaust gas purifying devices 16 and 21 can be absorbed by bending deformation of the bellows pipe 28 provided in the middle of the lateral pipe line 27 of the exhaust pipe 26.

Then, according to this embodiment, the first exhaust gas purifying device 16 and the second exhaust gas purifying device 21 are arranged by overlapping each other in the up and down direction on the upper side of the hydraulic pump 11 in the state connected by the connecting pipe 19. As a result, the two exhaust gas purifying devices 16 and 21 can be arranged in a narrow space around the engine 8 in a compact manner.

Incidentally, the inlet port 17A of the first exhaust gas purifying device 16 is provided on the side opposite to the engine 8 by sandwiching the axis O1-O1 of the cylindrical body 17 of the first exhaust gas purifying device 16. The exhaust pipe 26 is extended in the left and right direction of the upper revolving structure 3 on the front side of the engine 8 and the first exhaust gas purifying device 16. As a result, even the first and second exhaust gas purifying device 16 and 21 are close to the engine 8, the length dimension of the exhaust pipe 26 connecting the engine 8 and the first exhaust gas purifying device 16 can be made longer. As a result, the bellows pipe 28 of the exhaust pipe 26 can be made long in the axial direction. Therefore, the relative displacement between the engine 8 and the first exhaust gas purifying device 16 can be stably absorbed by the bellows pipe 28 of the exhaust pipe 26.

On the other hand, the exhaust pipe 26 is disposed in the state extending in the left and right direction of the upper revolving structure 3 on the front side of the engine 8 and the first exhaust gas purifying device 16. Therefore, in this embodiment, there is no need to dispose the exhaust pipe on the upper side of the engine 8 as the aforementioned conventional art, and a space between the upper side of the engine 8 and the engine cover part 14D can be made smaller. As a result, since the height dimension of the engine cover part 14D can be suppressed, rear visibility of the operator can be improved.

Moreover, the inlet port 17A of the first exhaust gas purifying device 16 and the exhaust port 9A of the engine 8 are provided at different positions in the up and down direction, and the bellows pipe 28 is constituted to be provided on the inclined pipe line part 27B of the exhaust pipe 26. Accordingly, the relative displacement between the engine 8 and the first exhaust gas purifying device 16 can be easily made to act in the bending direction of the bellows pipe 28. As a result, the relative displacement between the engine 8 and the first exhaust gas purifying device 16 can be effectively absorbed by bending deformation of the bellows pipe 28, and stability of the hydraulic excavator 1 can be improved.

Figure 9:
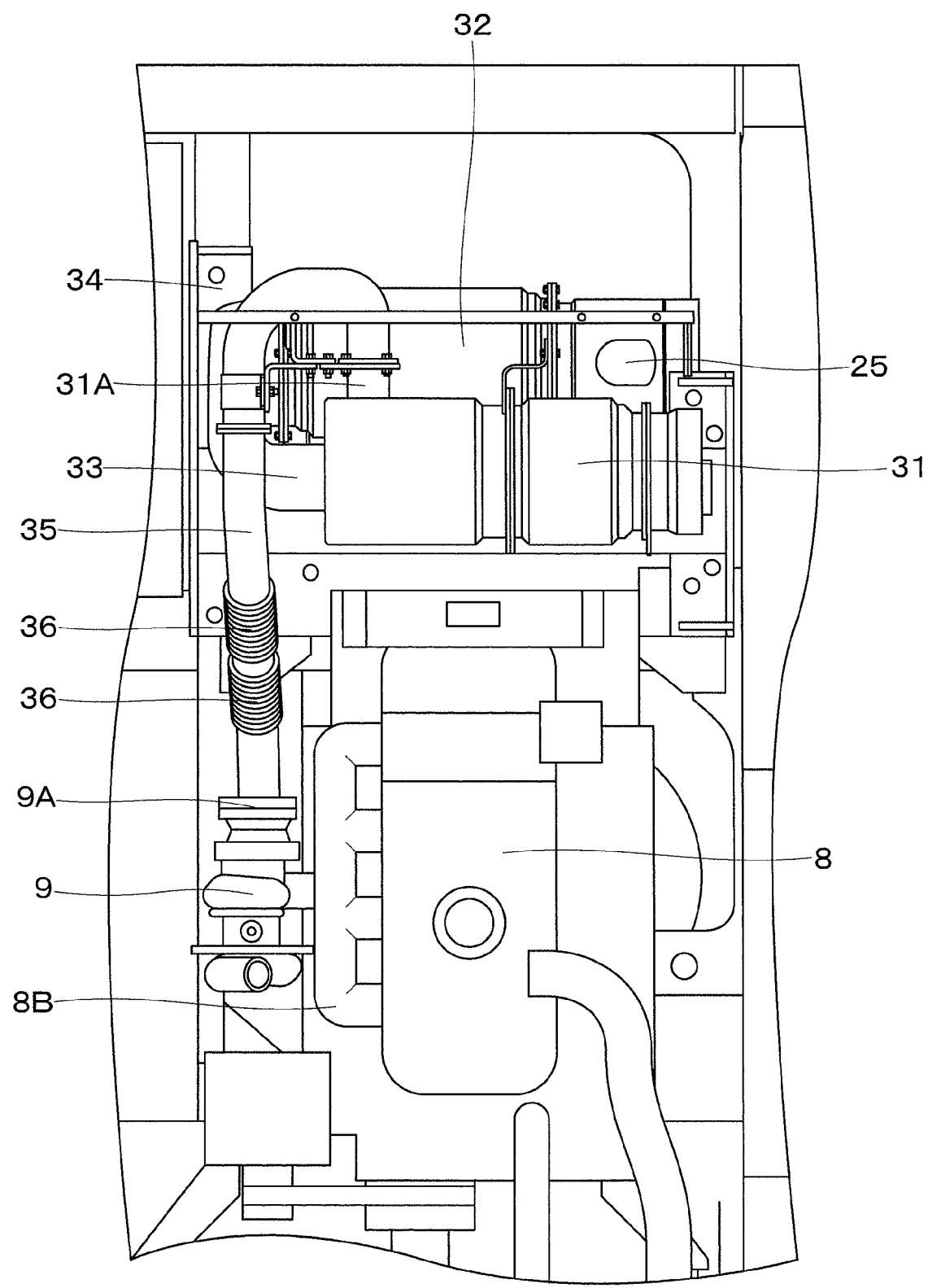
FIG. 9 is an enlarged plan view of a position similar to FIG. 4 showing the engine, the exhaust pipe, the first and second exhaust gas purifying devices and the like according to a modification.
Figure 10:
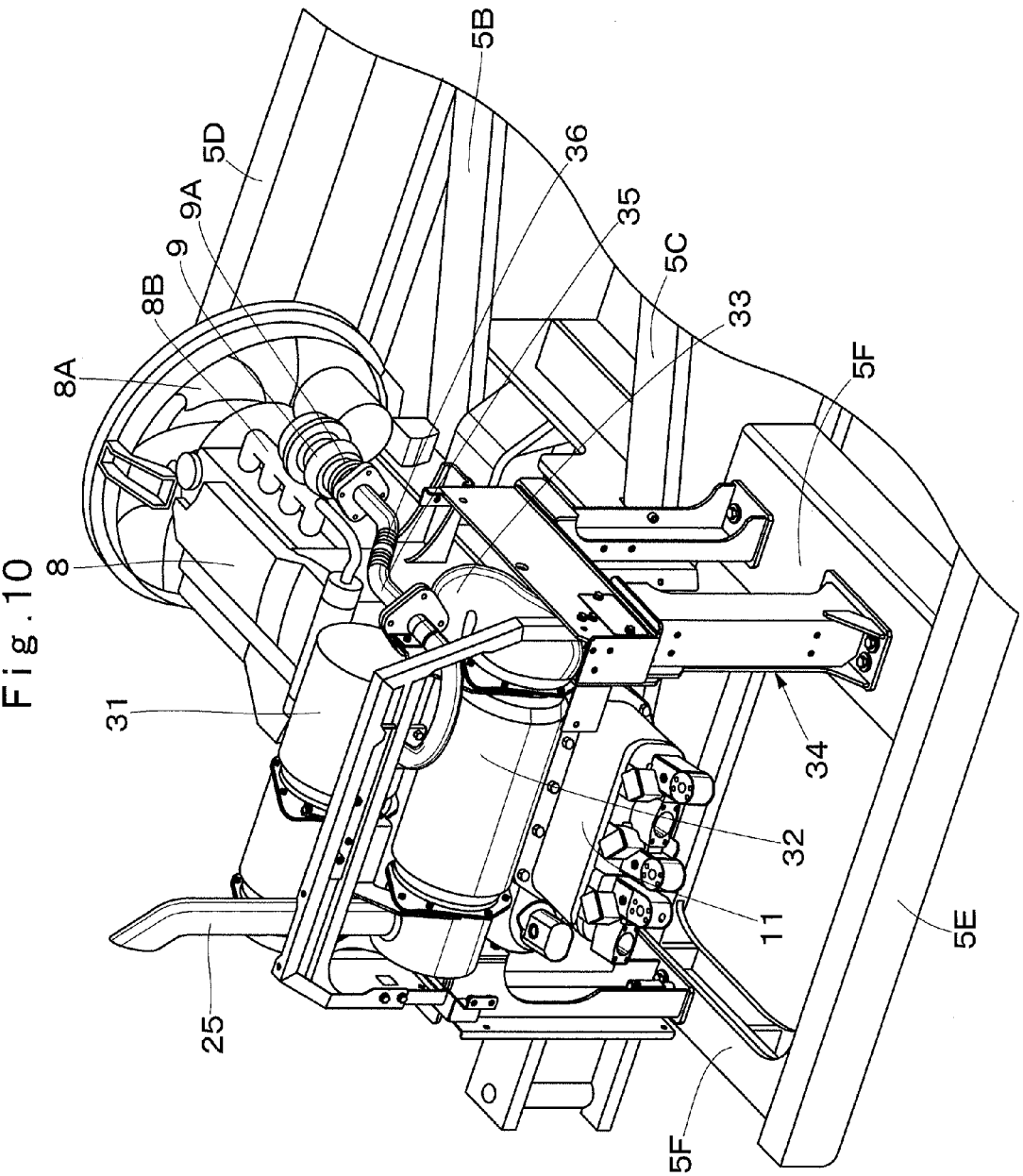
FIG. 10 is a perspective view similar to FIG. 6 showing the engine, the hydraulic pump, the exhaust pipe, the first and second exhaust gas purifying devices and the like according to a modification.
Figure 11:
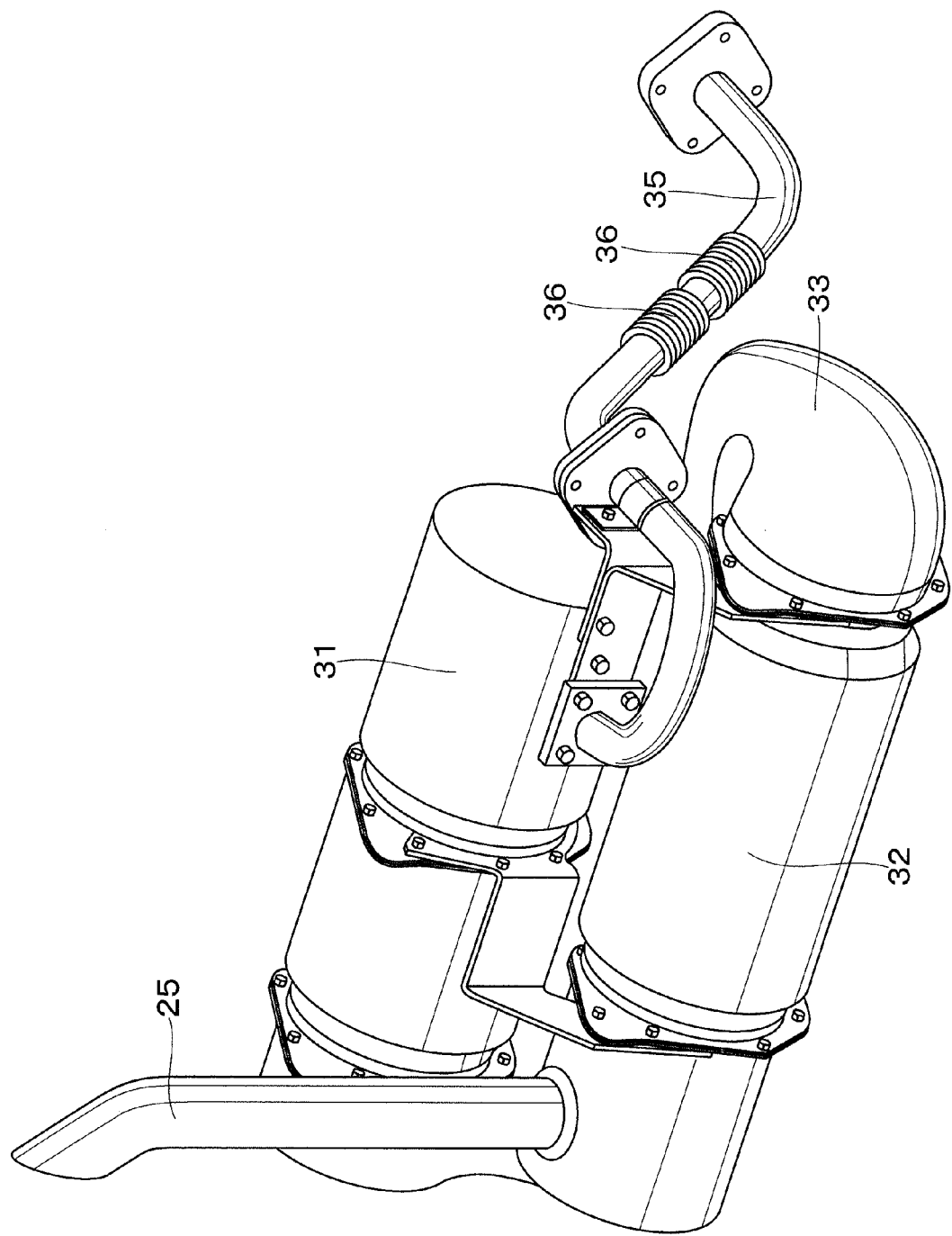
FIG. 11 is a perspective view similar to FIG. 7 showing the exhaust pipe and the first and second exhaust gas purifying devices according to the modification in the state removed from the engine.

It should be noted that the embodiment is explained by taking a case in which the first exhaust gas purifying device 16 is located on the lower side from the second exhaust gas purifying device 21, as an example. However, the present invention is not limited thereto but, may be constituted as in variations shown in FIGS. 9 to 11, for example. That is, a first exhaust gas purifying device 31 and a second exhaust gas purifying device 32 may be constituted to be arranged overlapping each other in the up and down direction in the state connected by a connecting pipe 33, and the first exhaust gas purifying device 31 is located on the upper side from the second exhaust gas purifying device 32.

The first exhaust gas purifying device 31 and the second exhaust gas purifying device 32 are mounted on a support bracket 34 provided on the revolving frame 5 in the state crossing across the hydraulic pump 11 in the front and rear direction. In this case, a dimensional difference in the up and down direction between the first exhaust gas purifying device 31 and the exhaust port 9A of the engine 8 can be made larger. Accordingly, a length dimension of an exhaust pipe 35 connecting the exhaust port 9A of the engine 8 and an inlet port 31A of the first exhaust gas purifying device 31 can be formed longer by its dimensional difference. As a result, a degree of freedom in selecting a length, a number, a position and the like of a bellows pipe 36 to be provided on the exhaust pipe 35 can be increased. Therefore, the relative displacement between the engine 8 and the first exhaust gas purifying device 31 can be efficiently absorbed by the bellows pipe 36.

The aforementioned embodiment is explained by taking a case in which the first exhaust gas purifying device 16 and the second exhaust gas purifying device 21 are arranged by overlapping each other in the up and down direction, as an example. However, the present invention is not limited thereto, and the first exhaust gas purifying device and the second exhaust gas purifying device may be arranged in parallel on the same plane, for example.

The aforementioned embodiment is explained by taking a case in which the two bellows pipes 28 are provided on the exhaust pipe 26, as an example. However, the present invention is not limited thereto, and three or more bellows pipes may be provided on the exhaust pipe or one long bellows pipe may be provided, for example. This also applies to the modification.

The aforementioned embodiment is explained by taking a case in which the inlet port 17A of the first exhaust gas purifying device 16 is provided above the exhaust port 9A of the engine 8, as an example. However, the present invention is not limited thereto, and the inlet port of the first exhaust gas purifying device may be provided below the exhaust port of the engine or the inlet port of the first exhaust gas purifying device and the exhaust port of the engine may be provided at a same height on a horizontal plane. In this case, the exhaust pipe may be disposed with inclination downward from the exhaust port or horizontally between the exhaust port and the inlet port. In any case, the inlet port of the first exhaust gas purifying device is located on a side opposite to the engine by sandwiching the axis of the cylindrical body of the first exhaust gas purifying device. This also applies to the modification.

The aforementioned embodiment is explained by taking a case in which the lateral pipe line 27 of the exhaust pipe 26 is constituted by the horizontal pipe line part 27A extending horizontally from the exhaust port 9A of the engine 8 and the inclined pipe line part 27B inclined upward toward the bent pipe line 29 from the tip end side of the horizontal pipe line part 27A, as an example. However, the present invention is not limited thereto, and the lateral pipe line of the exhaust pipe may be constituted only by the inclined pipe line part inclined toward the bent pipe line from the exhaust port of the engine or the lateral pipe line of the exhaust pipe may be constituted only by the horizontal pipe line part extending horizontally from the exhaust port of the engine, and the bent pipe line extending in the up and down direction may be connected to the tip end side of this horizontal pipe line part. This also applies to the modification.

The aforementioned embodiment is explained by taking a case in which the lateral pipe line 27 of the exhaust pipe 26 is constituted by the horizontal pipe line part 27A and the inclined pipe line part 27B, as an example. However, the present invention is not limited thereto, and it may be constituted by the horizontal pipe line part extending horizontally from the exhaust port of the engine and a vertical pipe line part extending in the up and down direction toward the bent pipe line from the tip end side of the horizontal pipe line part, for example. In this case, the bellows pipe may be provided on the horizontal pipe line part or the vertical pipe line part. This also applies to the modification.

The aforementioned embodiment is explained by taking a case in which only the oxidation catalyst 18 is provided in the cylindrical body 17 of the first exhaust gas purifying device 16, as an example. However, the present invention is not limited thereto, and a particulate matter removing filter (DPF) may be provided by being located on a downstream side of the oxidation catalyst in the cylindrical body of the first exhaust gas purifying device, for example. This particulate matter removing filter catches particulate maters in the exhaust gas exhausted from the engine and burns and removes it so as to purify the exhaust gas. The same applies to the modification.

Moreover, in the aforementioned embodiment, the hydraulic excavator 1 provided with the crawler type lower traveling structure 2 is described as an example of a construction machine. However, the present invention is not limited thereto, and may be applied to a hydraulic excavator provided with a wheel type lower traveling structure, for example. Other than that, it can be widely applied to the other construction machines such as a wheel loader, a dump truck, a hydraulic crane, and the like.

DESCRIPTION OF REFERENCE NUMERALS

1: Hydraulic excavator (Construction machine)
2: Lower traveling structure (Vehicle body)
3: Upper revolving structure (Vehicle body)
8: Engine
9: Supercharger
9A: Exhaust port
11: Hydraulic pump
16, 31: First exhaust gas purifying device
17: Cylindrical body
17A, 31A: Inlet port
17C: Outlet port
19, 33: Connecting pipe
21, 32: Second exhaust gas purifying device
22: Cylindrical body
26, 35: Exhaust pipe
27: Lateral pipe line
27A: Horizontal pipe line part
27B: Inclined pipe line part
28, 36: Bellows pipe
29: Bent pipe line
O1-O1: Axis of cylindrical body 17
O2-O2: Axis of cylindrical body 22

The invention claimed is:

1. A construction machine comprising:
an automotive vehicle body;
an engine mounted on said automotive vehicle body in a laterally placed state extending in a left and right direction of said automotive vehicle body;
a hydraulic pump provided on one side of said engine which is one side in a left and right direction of said automotive vehicle body;
an exhaust pipe connected to an exhaust port of said engine;
a first exhaust gas purifying device provided on an outlet side of said exhaust pipe;
a connecting pipe connected to an outlet port of said first exhaust gas purifying device; and
a second exhaust gas purifying device provided on an outlet side of said connecting pipe, wherein
each of said first exhaust gas purifying device and said second exhaust gas purifying device: i) has a cylindrical body having an axis extending in a front and rear direction of said automotive vehicle body, respectively, and ii) is arranged on an upper side of said hydraulic pump, so as that each cylindrical body becomes parallel with each other;
an inlet port of said first exhaust gas purifying device is provided on a side opposite to said engine; and
said exhaust pipe is constituted by a lateral pipe line extending in the left and right direction of said automotive vehicle body on a front side of said first exhaust gas purifying device and having a bellows pipe that absorbs relative displacement between said engine and said first exhaust gas purifying device in the middle of said exhaust pipe and a bent pipe line bent rearward having a U-shape from said lateral pipe line and connected to said inlet port of said first exhaust gas purifying device.

2. The construction machine according to claim 1, wherein
said inlet port of said first exhaust gas purifying device is provided above said exhaust port of said engine;
said lateral pipe line of said exhaust pipe has a horizontal pipe line part extending horizontally from said exhaust port of said engine and an inclined pipe line part inclined upward toward said bent pipe line from a tip end side of said horizontal pipe line part; and
said bellows pipe is provided on said inclined pipe line part.

3. The construction machine according to claim 1, wherein
said first exhaust gas purifying device and said second exhaust gas purifying device are arranged by overlapping each other in an up and down direction in a state connected by said connecting pipe; and
said first exhaust gas purifying device is located on a lower side of said second exhaust gas purifying device.

4. The construction machine according to claim 1, wherein
said first exhaust gas purifying device and said second exhaust gas purifying device are arranged by overlapping each other in an up and down direction in a state connected by said connecting pipe; and
said first exhaust gas purifying device is located on an upper side of said second exhaust gas purifying device.

* * * * *